(12) United States Patent
Verhelst et al.

(10) Patent No.: US 8,132,701 B2
(45) Date of Patent: Mar. 13, 2012

(54) RAIL AND CLAMP MOUNTING SYSTEM

(75) Inventors: Jan Verhelst, Menen (BE); Wim Van Ongeval, Ronse (BE); Kevin Bogoslofski, Southington, CT (US); Joe Settelmayer, McKinleyville, CA (US)

(73) Assignee: Thule Sweden AB, Hillerstorp (SE)

( * ) Notice: Subject to any disclaimer, the term of this patent is extended or adjusted under 35 U.S.C. 154(b) by 575 days.

(21) Appl. No.: 12/351,652

(22) Filed: Jan. 9, 2009

(65) Prior Publication Data

US 2009/0242714 A1    Oct. 1, 2009

Related U.S. Application Data

(60) Provisional application No. 61/020,313, filed on Jan. 10, 2008.

(51) Int. Cl.
*A47B 96/06* (2006.01)
(52) U.S. Cl. ........................................................ 224/558
(58) Field of Classification Search ................... 224/558; 248/227.2
See application file for complete search history.

(56) References Cited

U.S. PATENT DOCUMENTS

| 4,273,278 | A |   | 6/1981  | Storm |
|-----------|---|---|---------|-------|
| 4,487,348 | A | * | 12/1984 | Mareydt ........................ 224/321 |
| 4,757,929 | A | * | 7/1988  | Nelson ........................... 224/329 |
| 4,778,092 | A | * | 10/1988 | Grace ............................. 224/331 |
| 4,877,169 | A | * | 10/1989 | Grim .............................. 224/331 |
| 5,275,320 | A |   | 1/1994  | Duemmler |
| 5,419,479 | A |   | 5/1995  | Evels et al. |
| 5,492,258 | A | * | 2/1996  | Brunner ......................... 224/321 |
| 5,556,221 | A | * | 9/1996  | Brunner ...................... 403/322.4 |
| 5,577,649 | A | * | 11/1996 | Lee et al. ....................... 224/321 |
| 5,730,343 | A | * | 3/1998  | Settelmayer .................. 224/321 |
| 5,732,863 | A | * | 3/1998  | Stapleton ...................... 224/321 |
| 5,782,447 | A | * | 7/1998  | Hoffend ....................... 248/227.1 |

* cited by examiner

*Primary Examiner* — Brian D Nash
(74) *Attorney, Agent, or Firm* — Novak Druce + Quigg LLP

(57) ABSTRACT

A mounting system for attaching accessories to surfaces. The mounting system comprises a rail and clamp that includes housing for a bolt having a shaft extending outwardly of the housing from a first surface thereof. A hook extends outwardly of a second surface of the housing to engage the rail. A blade also extends outwardly of the second surface to be received in a channel of the rail. The hook and blade exert pressure on the rail during rotation of a knob along the shaft of the bolt to tighten the blade against the rail for releasable connection of the clamp to the rail, the clamp being adapted for attachment of accessories.

20 Claims, 4 Drawing Sheets

RAIL AND CLAMP MOUNTING SYSTEM

CROSS REFERENCE TO RELATED APPLICATIONS

The present application claims priority to U.S. Provisional Application 61/020,313 filed Jan. 10, 2008. Said application is expressly incorporated herein by reference in its entirety.

TECHNICAL FIELD

The present invention relates generally to accessory mounting systems for recreational equipment and the like. More specifically the invention relates to a detachable device for clamping accessories to rails secured to surfaces, particularly to surfaces of transporting vehicles including recreational vehicles (RVs).

BACKGROUND ART

In the many and varied recreational pursuits, including sporting activities, touring camping, and the like, there is a need to transport equipment and accessories used during recreation. Structures typically used for transporting recreational equipment and accessories include a variety of load carriers such as luggage racks, ski racks, bicycle racks and small item storage racks, for example. Load carriers mounted on roof, rear and side panel surfaces of transporting vehicles, for example, include rails, frames and rack pipes or bars, held by retainers including detachable connectors exemplified by bolts, screws and adjustable clamps.

Known clamping devices use brackets including apertures or shaped claw-like elements for insertion of rack pipes or rods with sliding capability of the clamping devices to a required position before adjusting a securing device to hold the clamp in position. An exemplary automotive luggage rack, described in U.S. Pat. No. 4,273,278, has a pair of side rails extending parallel to one another and supported above the vehicle roof in stanchions at opposite ends of the side rails. One or more cross rails is provided between the side rails passing through cross rail end fittings that encircle the side rails so that the cross rail can be moved longitudinally of the side rails. The cross rail end fittings have rotatable retainers to secure the cross rails to the side rails. Disclosures of U.S. Pat. Nos. 5,275,320 and 5,419,479 also describe a roof luggage carrier for an automotive vehicle. The carrier includes a pair of rails running the length of the vehicle and at least one transverse carrier extending between the rails. A clamping device at each end of the carrier clamps the respective rail. The clamping device includes a support jaw held stationary on the carrier and positioned on the side of the rail toward the outer side of the vehicle. An adjustable screw moves the clamping jaw against the rail.

In previously known devices it is possible to release the clamping devices to allow separation of carrier racks (or rods, pipes, etc.) from rails to which they are attached. It appears, however, that separation of parts requires tools for loosening screws or bolts, or further action to withdraw carrier racks or rods or pipes from openings or eyelets associated with the clamping devices.

Considering the need to overcome deficiencies of known designs for structures used for transporting recreational equipment, the present invention has been developed to alleviate these drawbacks by providing an accessory mounting system including a single action quick-release clamping device. Enhancements and benefits are presented in greater detail with respect to the present invention in the description that follows.

DISCLOSURE OF THE INVENTION

The present invention in its several disclosed embodiments alleviates the drawbacks described above with respect to conventionally designed accessory mounting systems and incorporates several additionally beneficial features for convenient attachment of a variety of accessories including transportable accessories of the type used in camping and recreational activities, for example.

A mounting system in accordance with the present invention facilitates attachment of accessories to surfaces. Suitable mounting surfaces could include walls and tailgates and panels of automobiles, trucks, campers and recreational vehicles (RVs) and the like. The mounting system comprises a first part that is a rail secured to a mounting surface and a second part of a rail clamp designed to grip the rail using a clamp retention element that has adjustment for tightening or loosening the grip of the clamp against the rail. A relatively loose grip between the rail clamp and the rail allows sliding movement of the rail clamp for optimal positioning along the length of the rail. The rail clamp has a design that allows single-action attachment of support elements suitable for holding objects for suspension from the mounting surface.

The rail of the mounting system in accordance with the present invention is typified by an elongate beam, which may include one or more extruded elongate beams, having structural features allowing the rail to be securely attached to a mounting surface. For example, the rail may be configured to receive a fastener, e.g., a screw, nail, rivet, or a protrusion, secured to the mounting surface of the vehicle. In another example, the rail may be secured to the side wall or rear wall of a vehicle, such as a recreational vehicle or motor home. Other features of a rail in accordance with the present invention include a slot extending the length of the rail and an elongate channel formed in the rail substantially at right angles to the slot. In a preferred embodiment of the mounting system in accordance with the present invention, the channel is orientated and viewable from a position facing the mounting surface. With this orientation, the slot is accessible above or below the rail.

The rail clamp houses a bolt that has a shaft (e.g., a threaded shaft) extending outwardly of the housing from a first surface thereof. A blade has an aperture formed to receive the shaft of the bolt to position the blade adjacent to the first surface. The blade extends outwardly of a second surface of the housing to be received in the channel and a hook extends from the second surface of the housing to engage the elongate slot.

When the hook engages the elongate slot and with the blade inserted in the channel a knob having an internal thread engages the threaded shaft of the bolt for rotation of the knob into abutment with the blade to tighten the blade against a friction or gripping surface of the channel for releasable gripping of the rail by the rail clamp. The rail clamp could include flanges, or brackets, or connectors, or cavities or the like that are designed for attachment of accessories such as camping equipment, or carriers or racks for transportation of sports equipment and the like.

More particularly, the present invention provides a mounting system for attaching accessories to surfaces. The mounting system comprises a rail having a horizontal surface including an elongate slot, the rail further including a substantially vertical surface having channel formed therein to include a friction or a gripping surface. A clamp comprises a housing for a bolt having a threaded shaft extending outwardly of the housing from a first surface thereof The housing has a second surface having a hook extending outwardly of the second surface to engage the elongate slot. A blade has an aperture formed to receive the threaded shaft of the bolt to position the blade adjacent to the first surface. The blade extends outwardly of the second surface to be received in the channel. A knob having an internal thread engages the threaded shaft of the bolt and when the knob is rotated in a first direction, e.g., tightened, the blade tightens against the friction or gripping surface for releasable connection of the clamp to the rail, the clamp being adapted for attachment of accessories.

Surfaces for attachment of accessories in accordance with the present invention include those selected from walls, tailgates and panels of automobiles, trucks, campers and recreational vehicles (RVs) and related transporting vehicles. One embodiment of the mounting system in accordance with the present invention includes the rail as an extruded rail having a groove along a side of the rail that will attach to one of the surfaces using fasteners attached to the one of the surfaces for insertion and retention at points along the length of the groove. As needed the mounting system includes a plurality of rails and clamps. For convenience, the clamp includes structures selected from the group consisting of flanges, brackets, connectors, and cavities and the like that are designed for attachment of accessories selected from carriers and racks used to transport sports and recreational equipment.

A preferred embodiment of the mounting system in accordance with the present invention has the elongate slot substantially at right angles to the channel formed in the rail. Also, the housing of the clamp further includes an opening to receive a support selected from a tube, a rod and the like for attachment of accessories.

An objective of the present invention is to provide an article for attaching accessories to a rail having releasable attachment to a mounting surface. The article includes a clamp comprising a housing for a bolt having a threaded shaft extending outwardly of the housing from a first surface thereof. The housing has a second surface from which a hook extends outwardly to engage an elongate slot formed in a horizontal surface of the rail. A blade has an aperture formed to receive the threaded shaft of the bolt to position the blade adjacent to the first surface. The blade extends outwardly of the second surface to be received in a channel of the rail. The article in accordance with the present invention also includes a knob having an internal thread to engage the threaded shaft of the bolt. When the knob is rotated in a first direction, the blade tightens against a gripping surface of the channel for releasable connection of the clamp to the rail. When the knob is rotated in a second direction, the bladed loosens from the gripping surface. The clamp may be adapted for attachment of accessories using structures selected from the group consisting of flanges, brackets, connectors, and cavities and other similar structures facilitating attachment of accessories. These structures are designed for attachment carriers and racks used to transport sports and recreational equipment.

The present invention also provides a process for attaching an accessory to a mounting surface. The process comprises providing a rail having a horizontal surface including an elongate slot. The rail further includes a substantially vertical surface having a channel formed therein to include a gripping surface. After attaching the rail to the mounting surface, connection is made between the rail and a clamp. The clamp comprises a housing for a bolt having a threaded shaft extending outwardly of the housing from a first surface thereof. The housing has a second surface having a hook extending outwardly thereof to engage the elongate slot. Also, the clamp includes a blade having an aperture formed to receive the threaded shaft of the bolt to position the blade adjacent to the first surface, the blade extending outwardly of the second surface to be received in the channel. Releasable connection of the clamp to the rail results from positioning of a knob, having an internal thread to engage the threaded shaft of the bolt. When the knob is rotated in a first direction, the blade tightens against a gripping surface of the channel for releasable connection of the clamp to the rail. When the knob is rotated in a second direction, the bladed loosens from the gripping surface. The clamp is adapted for attachment of accessories.

The beneficial effects described above apply generally to the exemplary devices and mechanisms disclosed herein of the accessory mounting system in accordance with the present invention. The specific structures through which these benefits are delivered will be described in detail herein below.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
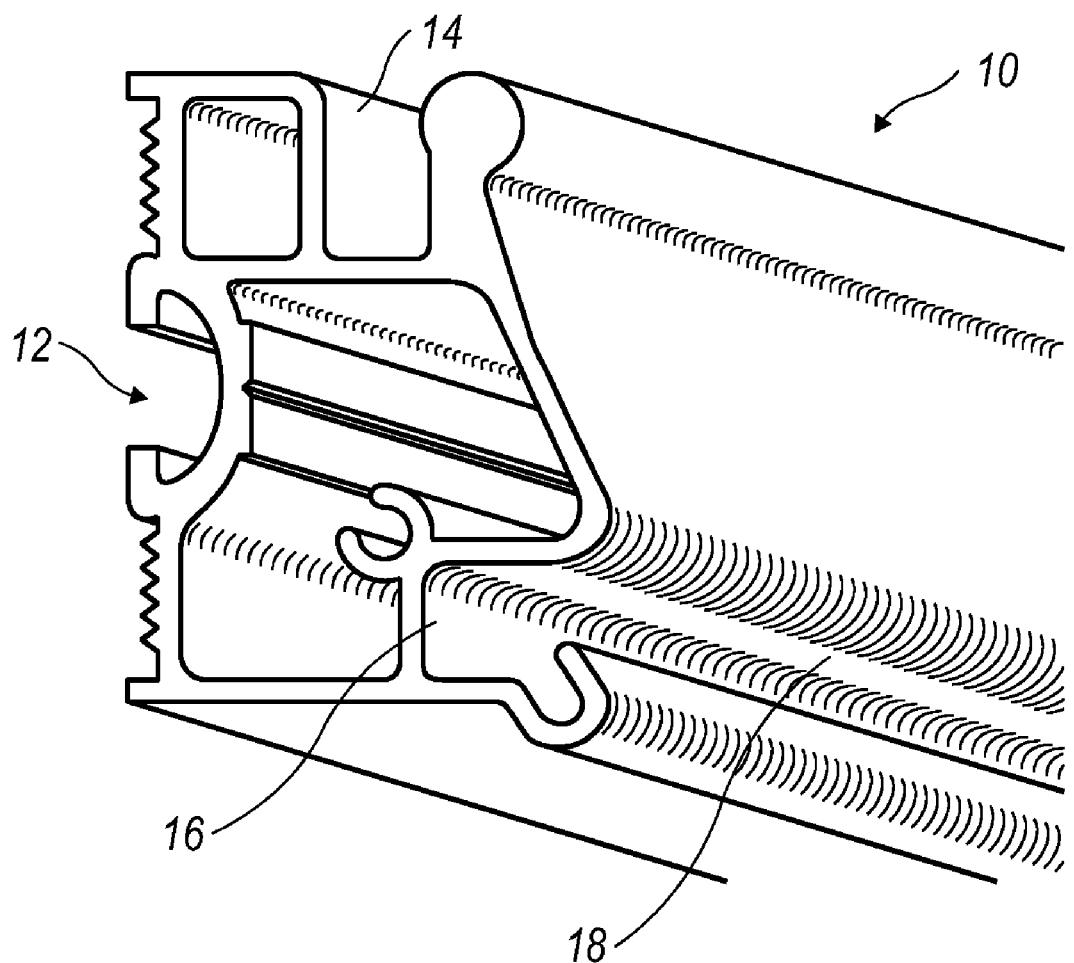
FIG. 1 is a partial perspective view of a rail usable in the mounting system in accordance with an exemplary embodiment of the present invention.

Referring to the figures, wherein like numbers refer to like parts throughout the several views, FIG. 1 shows a partial perspective view of one embodiment of a rail 10 usable in the mounting system according to the present invention.

As illustrated in FIG. 1, the rail is an extruded rail 10 that has a groove 12 along a side of the rail that can attach to a surface, such as a wall or vehicle panel, using fasteners attached to the surface for insertion and retention at points along the length of the groove 12. For example, a fastener, such as a screw, a nail, a rivet, or a protrusion, secured to the vehicle and extending from the surface of the vehicle. The rail 10 includes a slot 14 and a channel 16 having a friction or a gripping surface 18. Both the slot 14 and the channel 16 extend the length of the rail 10. When mounted to a suitable surface, the orientation of the rail 10 positions the slot 14 optionally accessible at the upper surface or lower surface of the rail 10. Access to the channel is from the outward facing surface of the rail 10 regardless of mounting orientation.

Figure 2:
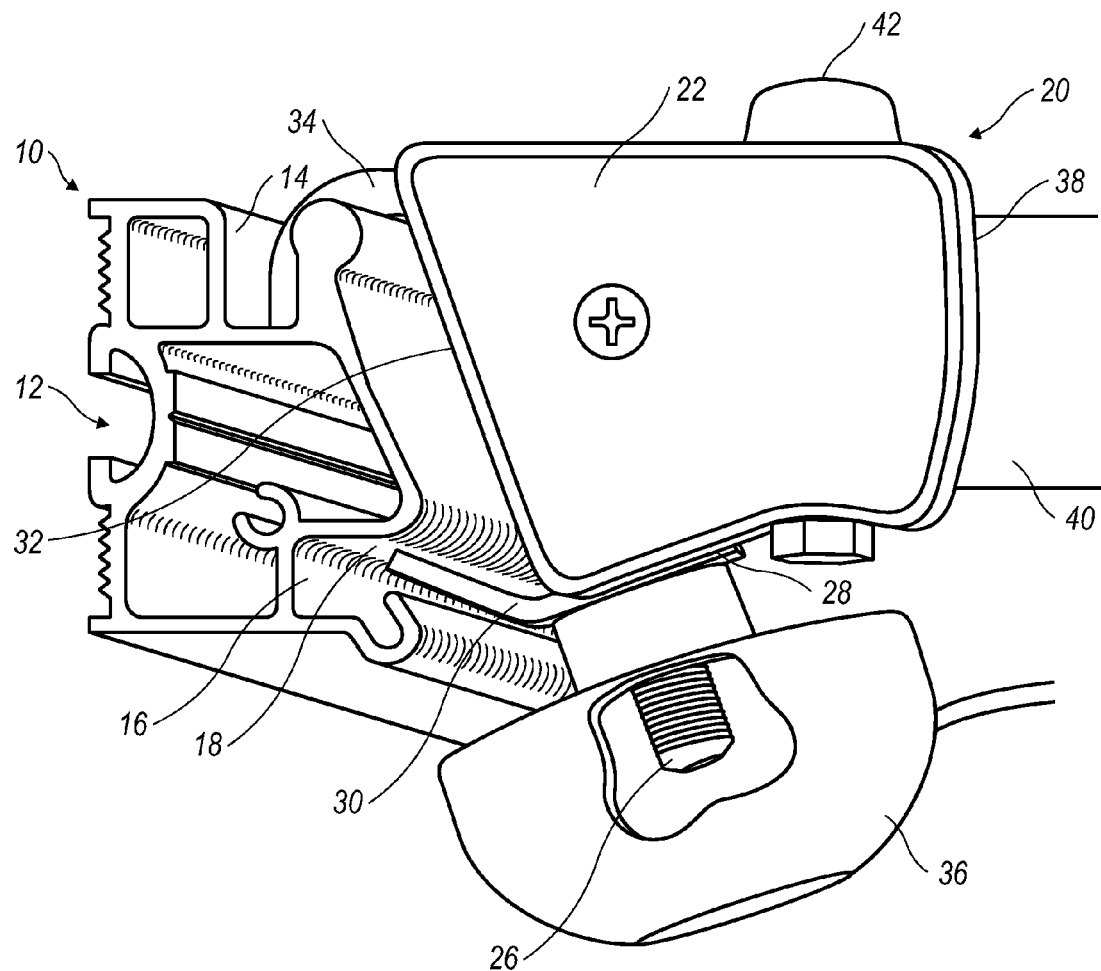
FIG. 2 provides a partial cross-section of a mounting system showing connection between a rail and rail clamp used for accessory attachment in accordance with an exemplary embodiment of the present invention.
Figure 3:
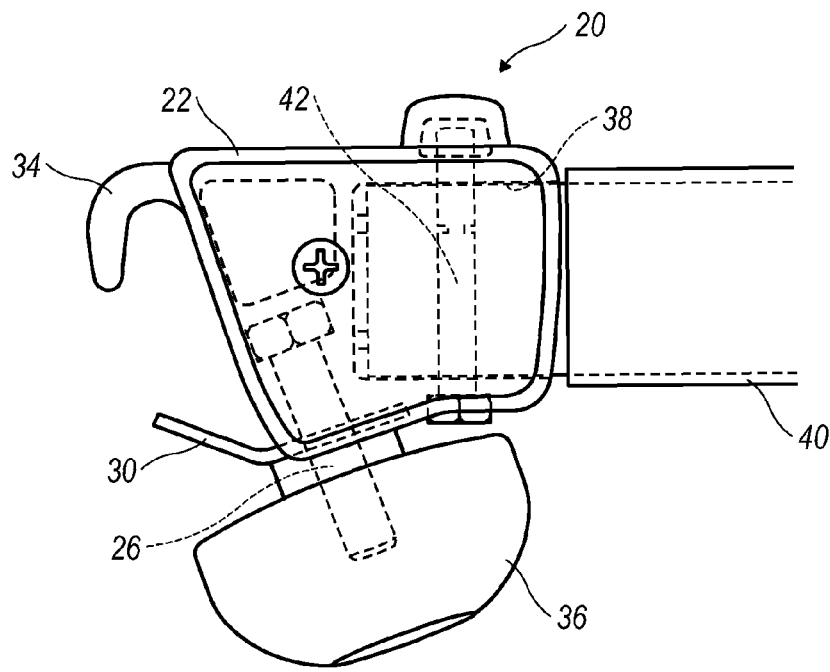
FIG. 3 is a cross sectional view of a rail clamp in accordance with an exemplary embodiment of the present invention.

FIG. 2 provides a partial cross-section of a mounting system according to the present invention showing connection between a rail 10 and rail clamp 20 used for accessory attachment. The rail clamp 20 includes a housing 22 for a bolt 24 (as shown in FIG. 3) that has a shaft 26 extending outwardly of the housing 22 from a first surface 28 thereof. The shaft 26 may be threaded. A blade 30 has an aperture formed to receive the shaft 26 of the bolt 24 to position the blade 30 adjacent to the first surface 28. The blade 30 extends outwardly of a second surface 32 of the housing to be received in the channel 16 and a hook 34 extends from the second surface 32 of the housing 22 to engage the slot 14.

When the hook 34 engages the elongate slot 14 and with the blade 30 inserted in the channel 16, a knob 36 having an internal thread engages the threaded shaft 26 of the bolt 24. When the knob 36 is rotated in a first direction, e.g., tightened, the blade 30 tightens against the gripping surface 18 of the channel 16 for releasable gripping of the rail 10 by the rail clamp 20. When the knob 36 is rotated in a second direction, e.g., loosened, the blade 30 loosens or moves away from the gripping surface 18 of the channel 16. The housing 22 also forms or includes an opening 38 to receive a tube or rod or similar support element 40 to which accessories could be attached. Retention of the support element 40 inside the housing uses a connector 42 identified in the illustrated embodiment as a nut and bolt combination.

FIG. 3 is a detail cross sectional view showing a rail clamp 20 and internal structure according to a preferred embodiment of the present invention. This view clearly shows features of the rail clamp 20 including the hook 34 and bolt 24, each of which is secured inside the housing 22. The illustration also clarifies how the knob 36 engages the threaded shaft 26 of the bolt 24 for rotation to move the blade 30 towards the hook 34 so that the rail clamp 20 exerts a gripping force on the rail 10, between the hook 34 and the blade 30, when the tip of the hook 34 occupies the slot 14 and the blade 30 abuts the friction or gripping surface 18. An optional structure for attachment of accessories is shown as a support element 40 inserted in an opening 38 of the housing 22 and secured therein using a connector 42 identifiable as a nut and bolt combination.

Figure 4:
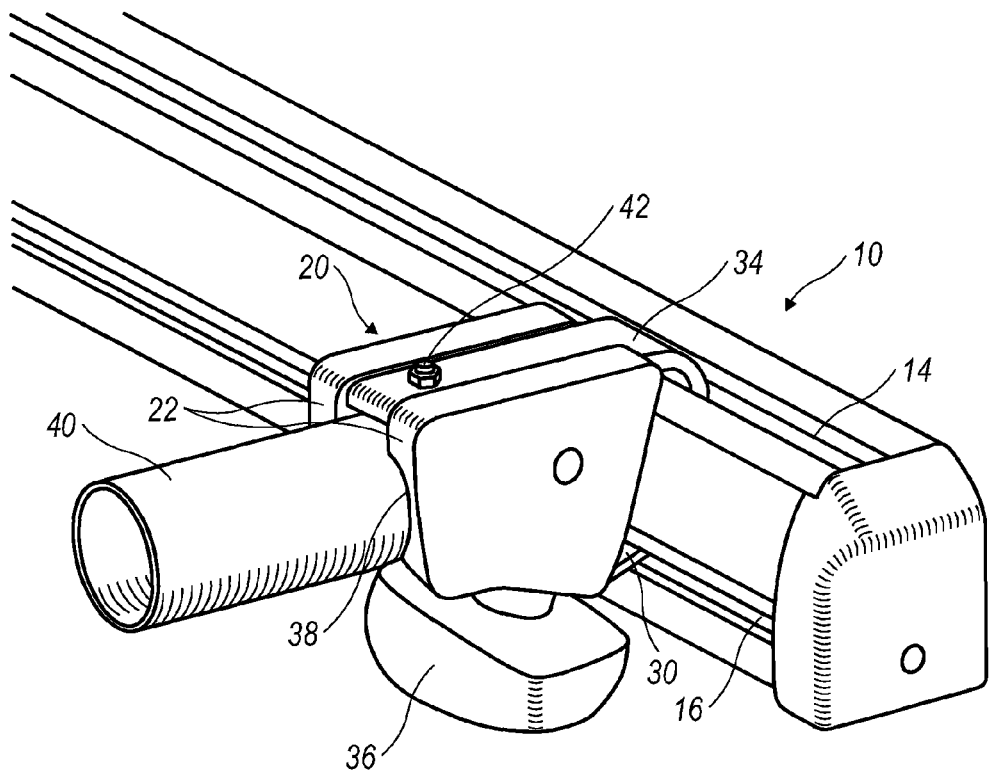
FIG. 4 is a perspective view showing a rail clamp attached to a rail of the mounting system in accordance with an exemplary embodiment of the present invention.

FIG. 4 is a perspective view showing a rail clamp 20 attached to a rail 10 of the mounting system according to the present invention. This view shows that the rail clamp 20 attaches to the rail 10 by inserting the hook 34 in the slot 14 extending along the top edge of the rail 10 and positioning the blade 30 in the channel 16 in the outward facing side of the rail 10. Orientation of the rail clamp 20 as shown places the knob 36 on the underside of the clamp 20. Rotation of the knob 36 in a first direction, increases the pressure of the blade 30 on the friction or gripping surface 18 of the channel 16 to tighten the grip of the rail clamp 20 on the rail 10. Rotation of the knob 36 in a second direction, reduces the pressure of the blade 30 on the friction or gripping surface 18 of the channel 16 thereby reducing the grip of the rail clamp 20 on the rail 10. A single support element in the form of a pipe 40 inserted in an opening 38 of the housing 22 and secured there using a connector 42 provides a suitable point of attachment for accessories that can be suspended from the rail 10.

Figure 5:
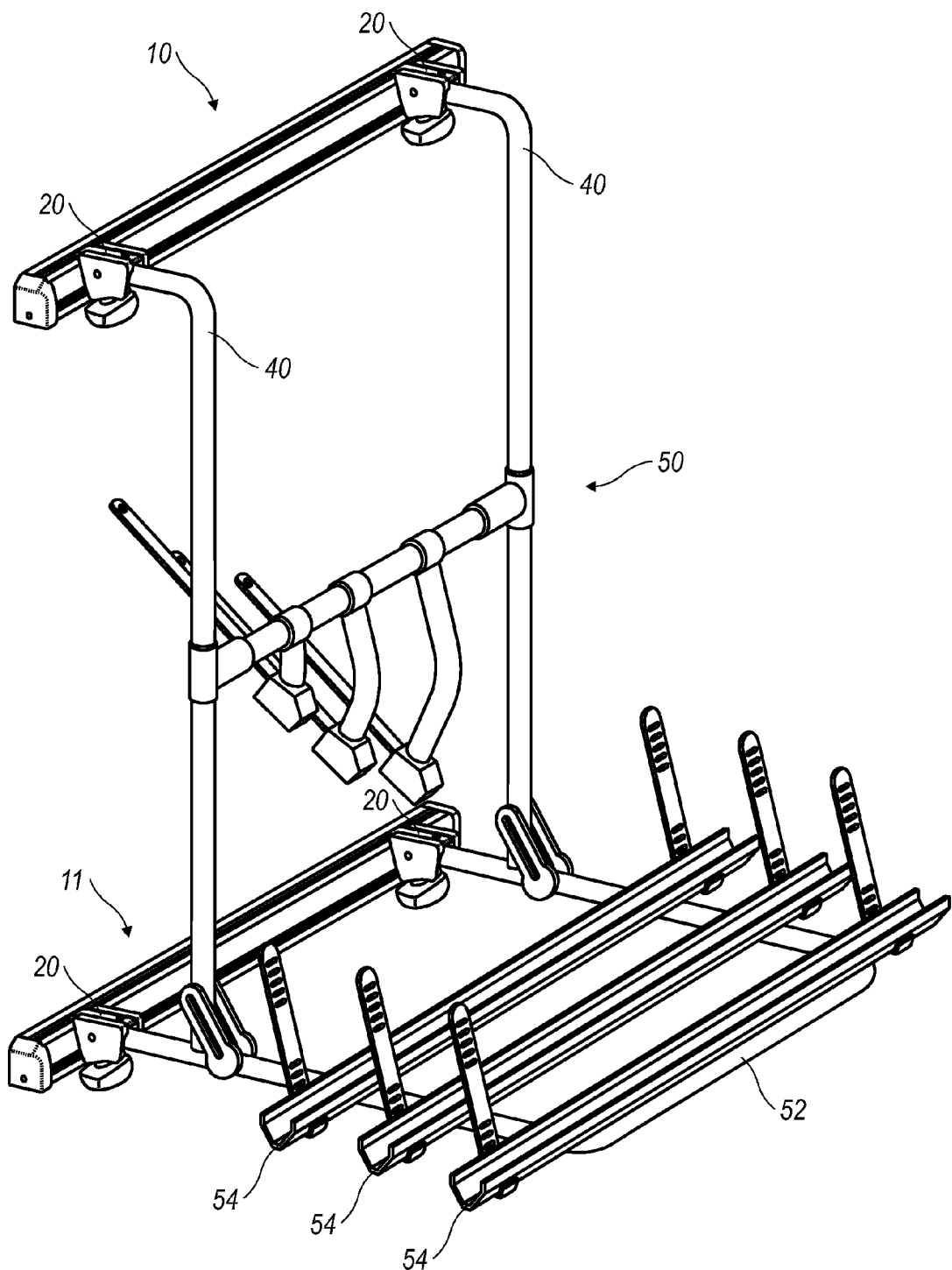
FIG. 5 shows a perspective view of a load carrier attached to wall mounted rail using rail clamps in accordance with an exemplary embodiment of the present invention.

FIG. 5 shows a perspective view of an accessory that is attachable to a wall or vehicle panel using the mounting system of the present invention. The accessory is a load carrier 50 suitable for attachment to the rear wall of a RV, for example, to provide storage for bicycles and related sports equipment. The arrangement shown in FIG. 5 uses an upper rail 10 and a lower rail 11 mounted at the rear of the RV for attaching two support elements 40 using four rail clamps 20; one at each end of the support elements 40. The load carrier 50 includes a frame 52 designed to support and secure one or more bicycle racks 54 on the RV for transporting bicycles or for bicycle storage on a parked RV. Having exemplified an accessory as a load carrier, it is not intended that the present invention be limited as to the type of accessory since one of ordinary skill in the art will recognize accessories that could optionally replace the load carrier as an accessory suitable for attachment to a wall or panel using the rail and clamp mounting system according to the present invention.

An accessory mounting system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the sports, recreation and camping industries.

What is claimed is:

1. A mounting system for attaching an accessory to a surface of a vehicle, the mounting system comprising:
    a rail having a horizontal surface including an elongate slot, the rail further including a substantially vertical surface having a channel formed therein;
    a clamp comprising a housing for a bolt having a shaft extending outwardly of the housing from a first surface thereof, the housing having a second surface;
    a hook extending outwardly of the second surface and engaging the elongate slot;
    a blade having an aperture formed to receive the shaft of the bolt to position the blade adjacent to the first surface, the blade extending outwardly of the second surface of the clamp and received in the channel; and
    a knob having an internal thread engaging the shaft of the bolt, wherein in the event the knob is rotated in a first direction, the blade tightens against channel, the clamp being adapted for attachment of accessories.

2. The mounting system recited in claim 1, wherein the shaft of the bolt is threaded.

3. The mounting system recited in claim 1, wherein upon in the event the knob is rotated in a second direction, the blade loosens against the channel.

4. The mounting system recited in claim 1, wherein the rail further comprises a groove formed along a side of the rail, the groove being configured to receive at least one fastener protruding from a surface of a vehicle.

5. The mounting system recited in claim 1, wherein the rail is an extruded rail.

6. The mounting system recited in claim 1, wherein the clamp includes structures selected from the group consisting of flanges, brackets, connectors, and cavities with the clamp being configured to attach one or more accessories to the mounting system with the one or more accessories being selected from carriers and racks for transporting equipment.

7. The mounting system recited in claim 1, wherein the elongate slot is substantially at a right angle to the channel.

8. The mounting system recited in claim 1, wherein the housing further comprises an opening configured to receive a support selected from a tube and a rod of a carrier or rack for transporting equipment.

9. The mounting system recited in claim 1, wherein the channel comprises a gripping surface with the blade tightening against the gripping surface in the event the knob is rotated in the first direction.

10. An article for attaching accessories to a rail having releasable attachment to a mounting surface, the rail having an elongate slot formed in a horizontal surface of the rail and a channel formed in the rail, the article including:
   a clamp comprising a housing for a bolt having a shaft extending outwardly of the housing from a first surface thereof, the housing having a second surface;
   a hook extending outwardly of the second surface to engage the elongate slot formed in the horizontal surface of the rail;
   a blade having an aperture formed to receive the shaft of the bolt to position the blade adjacent to the first surface, the blade extending outwardly of the second surface of the clamp and adapted to be received in the channel of the rail; and
   a knob having an internal thread to engage the shaft of the bolt, wherein in the event the knob is rotated in a first direction, the blade tightens against channel in the event the blade is received in the channel, the clamp being adapted for attachment of accessories.

11. The article recited in claim 10, wherein the shaft of the bolt is threaded.

12. The article recited in claim 10, wherein upon in the event the knob is rotated in a second direction, the blade loosens against the channel.

13. The article recited in claim 10, wherein the groove is configured to receive at least one fastener protruding from a surface of a vehicle.

14. The article recited in claim 10, wherein the clamp includes structures selected from the group consisting of flanges, brackets, connectors, and cavities with the clamp being configured to attach one or more accessories to the mounting system with the one or more accessories being selected from carriers and racks for transporting equipment.

15. The article recited in claim 10, wherein the elongate slot is substantially at a right angle to the channel.

16. The article recited in claim 10, wherein the housing further comprises an opening configured to receive a support selected from a tube and a rod of a carrier or rack for transporting equipment.

17. The article recited in claim 10, wherein the blade tightens against a gripping surface of the channel in the event the knob is rotated in the first direction.

18. A process for attaching an accessory to a mounting surface, the process comprising the steps of:
   providing a rail having a horizontal surface including an elongate slot, the rail further including a substantially vertical surface having a channel formed therein to include a gripping surface;
   attaching the rail to the mounting surface;
   making a releasable connection between the rail and a clamp comprising a housing for a bolt having a threaded shaft extending outwardly of the housing from a first surface thereof, the housing having a second surface having a hook extending outwardly thereof to engage the elongate slot, the clamp including a blade having an aperture formed to receive the shaft of the bolt to position the blade adjacent to the first surface, the blade extending outwardly of the second surface to be received in the channel; and
   positioning a knob having an internal thread to engage the threaded shaft of the bolt, wherein rotating the knob in a first direction causes the blade to tighten against the channel.

19. The process recited in claim 18, wherein rotating the knob in a second direction causes the blade to loosen against the channel.

20. The process recited in claim 19, further comprising attaching an accessory to the clamp, wherein the accessory is one of carrier and rack.

* * * * *